INVENTORS
LELAND D. GREEN
WALDEMAR SAEGER
ARMAND R. TANGUAY
BY
Anthony D. Cennamo
Daniel Rubin
ATTORNEYS INVENTORS
LELAND D. GREEN
WALDEMAR SAEGER
ARMAND R. TANGUAY
BY Anthony D. Cennamo
Daniel Rubin
ATTORNEYS INVENTORS
LELAND D. GREEN
WALDEMAR SAEGER
ARMAND R. TANGUAY
BY Anthony D. Cennamo
Daniel Rubin
ATTORNEYS 3,445,598

FACSIMILE APPARATUS OPERABLE OVER TELEPHONE LINES WITH ACCELERATED OPERATION PAST BLANK AREAS OF A DOCUMENT

Leland D. Green, Pasadena, Waldemar Saeger, La Canada, and Armand R. Tanguay, Pasadena, Calif., assignors to Xerox Corporation, Rochester, N.Y., a corporation of New York Filed July 14, 1965, Ser. No. 471,911
Int. Cl. H04m *11/06*
U.S. Cl. 179—4 6 Claims

ABSTRACT OF THE DISCLOSURE

Facsimile communication apparatus in which transmission is effected through common carrier transmission media to a like remote facsimile apparatus. There is disclosed a facsimile transceiver system including separate paper paths for scanning and recording in the transmit and receive modes respectively, including stepping drives for advancing the scanner and recorder drives past areas on the original document devoid of information.

This invention relates to a facsimile transceiver system and apparatus. More specifically, the invention relates to facsimile recording system and apparatus capable of alternately transmitting and receiving video intelligence information through the hand set of a direct distance dialing telephone network.

Many facsimile systems are known and in use today and have enjoyed a recent surge of commercial success. The art of transmitting pictures over phone lines or other communications media has been existent for many years and generally consists of two systems operating in synchronism by use of common power lines or alternately by use of extremely accurate power supply sources. Phasing or course synchronization of equipment is generally provided by a single pulse at the beginning of each line. This pulse is used to phase a motor to a proper synchronous position while also used for other control functions, such as, start and termination of the various transports such as the document and the paper recording media.

In general, most known machines operate on a similar principle, i.e. a rotating drum or equivalent is used which causes a document to be scanned in one direction while the document slowly and continuously moved in the other direction. A common characteristic of the prior art facsimile systems, therefore, is that the transmitted pulse or signalling information consists of a single synchronizing pulse, usually a super black pulse, followed by one line of the video information. Further synchronization is generally achieved by using a synchronous motor operated from the same power lines or alternately operated from super-precise signal generators. Phasing or course synchronization is generally accomplished by a mechanical ratcheting means, which allows receiving driven device to preset timewise until synchronization is achieved at which time it latches in.

Existent devices, therefore, are generally operated over leased telephone lines or other direct communication media, and generally fairly good control over the communications path is available at the time of installation. This allows the use of optimizing techniques to adapt the line to the situation and generally allows a fairly respectable data transmission speed, since a greater bandwidth is available when lines are capable of being equalized. However, and notwithstanding the prior art capabilities, where long distance leased line lashups are in existence for facsimile transmission, the equipment cost often becomes secondary to the cost of rental of phone lines. Data transmission times of the order of six minutes per document are not a limiting factor in this type of application, since the cost of the line is usually the same whether it is utilized or not. However, when one considers the use of direct distance dialing and the cost of long distance telephone calls, it becomes immediately apparent that significant tradeoffs could exist requiring low equipment cost despite higher transmission rates. Furthermore, it should be apparent that a system dependent and restricted to the same power supply network, inherently limits the flexibility and utility thereof.

Now in accordance with the instant invention there is provided a novel facsimile transceiver system and apparatus capable of being operated over direct distance dialing telephone networks. By means thereof a greater variety of locations can be more conveniently linked for facsimile transmission of video or graphic information to be conveniently reproduced at the receiving end. In order to obtain optimum utilization of the telephone facilities and minimize transmission charges, the apparatus hereof includes a novel feature of stepped operation where an absence of information occurs during transmission.

Accordingly, it is an object of the invention to provide a novel facsimile system and transceiver apparatus capable of being operated over direct distance telephone dialing networks.

It is a further object of the invention to provide a novel facsimile transceiver apparatus capable of being employed in synchronization with any other similar system available by direct dial hookup.

It is a further object of the invention to provide for a facsimile transceiver apparatus that is self sufficient and not directly dependent on the services of the local telephone utilities for installation and relocation.

It is a still further object of the invention to provide a facsimile recording system and apparatus more economical and versatile than comparable prior art devices.

It is a still further object of the invention to provide a facsimile transceiver apparatus capable of accelerated operation past corresponding blank areas of a document while yet recording the received informtion identical to the original.

Further objects and features of the invention will become apparent by reading the following description in connection with the drawings wherein.

The apparatus to be described is intended as a combined transmitter and receiver for facsimile data; hence, the term "transceiver." Obviously, separate transmitter and receiver units are possible variations of that to be described. It will be understood when referring specifically to these drawings that the transceiver is coupled to the telephone system by an acoustical coupler and modem. This modem and acoustical coupler convert signals received from a remote telephone linked transceiver in the transmit mode into variable frequency notes. These in turn are fed into a loud speaker or other device which in turn modulates the phone transmitter. The input signal is then carried over the phone line system to a remote receiver with a similar unit attached to it, which either acoustically or inductively takes the signal from its respective receiver and reconverts it into a signal corresponding to the original input.

Accordingly, before transmission takes place from either of the remote locations a direct distance telephone communication is made between the respective operators who then place their respective machines in the proper operating mode for transmission of the video information from one to the receiver at the other location. That is, as soon as communication has been established between the two remotely located units, the operators link their units by turning the machines on and placing the respective phone hand sets into an acoustical coupler unit as will be described.

Figure 1:
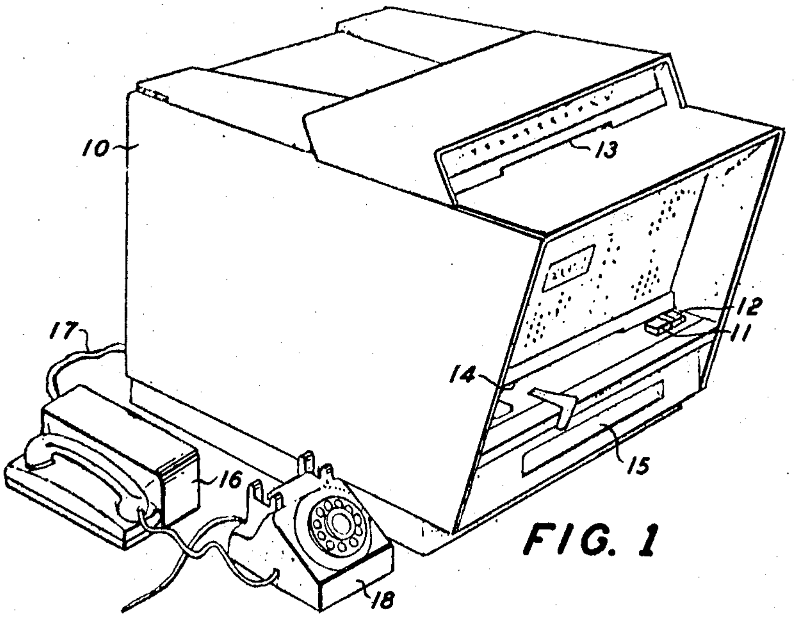
FIG. 1 is an isometric exterior view of a transceiver apparatus hereof as connected to a remote telephone hand set.

Referring now to FIG. 1 the exterior of the apparatus is shown comprising a cabinet-housing 10, utilized by an operator at the front which includes a start and stop button 11 and 12 respectively. On the topside near the front of the cabinet is an opening 13 for inserting an original document to be scanned for transmission purposes while openings 14 and 15 provide for the insertion and emergence of recording paper when the particular apparatus is operated in the receiving mode. Also shown in accordance with this embodiment, is the coupling unit 16 located remote from the apparatus connected via cable 17 and operable in combination with a conventional telephone handset 18.

Figure 2:
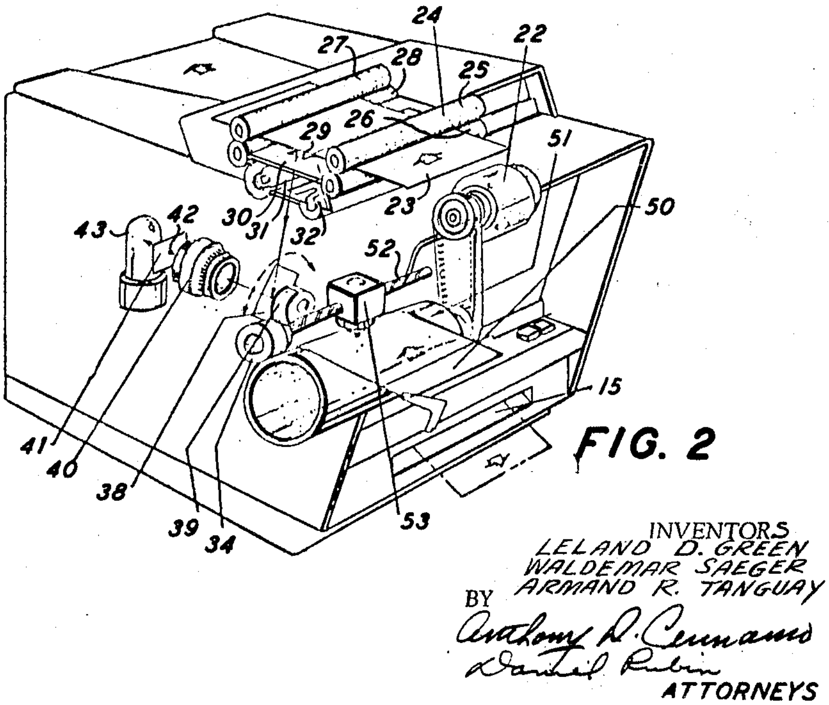
FIG. 2 is an isometric view with the covers partially removed to reveal the operating mechanism of the apparatus.

In FIG. 2 there is shown the major elements comprising the apparatus hereof. Consider first the transmission mode for transmitting video information of a document original to the remotely linked location established by virtue of a previous direct distance dialing communication via telephone 18. With telephone handset placed in its appropriate position on coupling unit 16, an original document 23 is hand fed into opening 13 to be gripped in the bite of a document transport 24 that comprises a pair of input drive rolls 25 and 26 and a pair of exiting drive rolls 27 and 28. As the document passes incrementally between the entering and exiting drive rolls it passes an exposure slit 29 formed in a rectangular plate 30 whereby the portion of the document thereat is intensely illuminated by a pair of high intensity lamps 31 and 32.

Light from the copy passing through slit 29 is reflected downwardly through a corresponding aligned slit 33 onto an oscillating mirror 38 being driven by a galvanometer drive 39. The information or the absence thereof is reflected onto the mirror from where it is reflected into a lens 40. The lens focuses the transmitted light into a light control plate 41 having an aperture 42 aligned coaxially with the lens permitting the light to pass to a photosensor such as a photomultiplier tube 43. The signal emitted by the photomultiplier is then emitted through the logic circuitry (not shown) into the acoustic coupler unit 16 for transmission to the receiver of the transceiver apparatus at the linking location.

To determine the presence or absence at this time of information in the document line thereabove, the mirror sweeps the slit area rapidly. The document transport is incrementally advanced by a step motor (not shown) controlled in a manner more fully disclosed in applications co-filed herewith, entitled, Facsimile Line Skipping System, Ser. No. 471,999, now abandoned and Method and Apparatus for Accomplishing Line Skipping in a Facsimile System, Ser. No. 471,874. Where there is determined to be a presence of information in the line above the slit or alternatively where there is an absence of information thereat, the signal output of the photomultiplier causes the document transport to be advanced one step by the step motor. The same signal is likewise transmitted to the receiver of the linking unit and its step motor associated with the recording unit advances its recording implement to a corresponding position.

Accordingly, the oscillating mirror 38 sweeps the document rapidly to determine the presence or absence of information in a line above slit 29. If there is an absence of information, an emitted signal advances the document transport by operating the step motor one step. The signal is also sent to the receiver and its step motor positions the recording device correspondingly. This action continues at a high rate to effectively skip blank areas until the oscillating mirror scans a line containing information. As soon as this condition occurs, the mirror is placed under control of a normal speed scan generator whose position is in synchronism with the relative spot on the copy sheet in the remote receiver unit. When the transmitter mirror next returns to the beginning of its sweep, a pulse is emitted which indicates to the remote receiver that the following information is video to be transmitted and reproduced. This enables the recording device in the receiver to be operable while oscillating mirror 38, in the transmitter, scans the document sending signals over the line to the recorder to print a corresponding line of information.

In the receiver portion of the apparatus in accordance with this first embodiment, and operative alternatively with the transmitter a finite length of input copy recording sheet 50 such as paper is inserted via opening 14. The paper wraps tautly in tension about rotating drum 51 being driven by step motor 22 and emerges ultimately through exit slot 15. Supported above the paper parallel and approximately co-extensive with the drum axis on a rotatable helix drive screw 52 is a recording or marking device 53. The marking device can comprise an ink spitter or the like that is selectively signal responsive as is known in the art, and which rapidly traverses the paper surface for each corresponding information signal scan as seen by the oscillating mirror 38. Accordingly with a document being scanned, the transmitting unit emits a series of synchronizing pulses. The receiving unit recognizes these pulses and goes into a synchronizing operation. Marking device 53 therefore is caused to traverse the paper surface rapidly when energized by step motor 34 and causes a marking material such as liquid ink to be deposited in the scan with each information signal pulse received by the receiver. When determined as described above that no information is present in the line being scanned, a signal to step motor 34 permits marking device 53 to remain stationary at either end of the helix while step motor 22 is incrementally accelerated. By this means skipping is effected for time compression of the information being recorded and enables accelerated operation between the transmitter and receiver minimizing line charges therefor.

Figure 3:
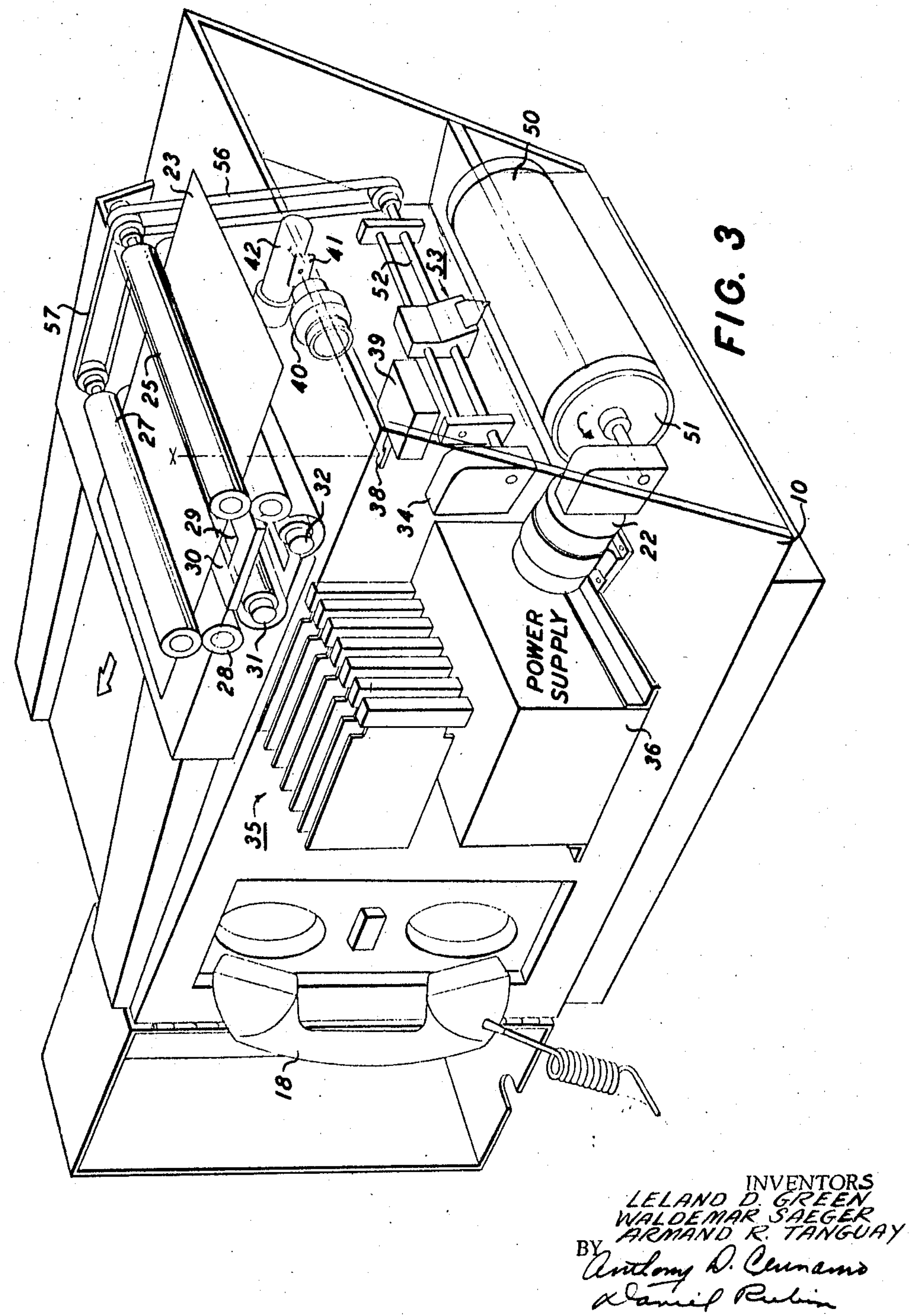
FIG. 3 is an isometric view similar to FIG. 2 of a second embodiment variation.

Referring now to FIG. 3 there is shown a variation of the previous embodiment that includes a telephone handset 18 integrally mounted within the cabinet housing 10. Also, the recording paper 50, rather than being a continuous feed, is instead securely wrapped as an endless web about continuously and informing rotating drum 51. Further, the transmitter document transport and the recording drum are for convenience synchronously linked via timing belts 56 and 57 as to be operative from a single stepping motor 34. The motor rather than effecting complete traversal of the marking implement across the drum axis, steps it incrementally with each step of the original document as described above. That is, recording implement 53 is advanced only one step corresponding to the end of scan of each line of the original and instantly steps where there occurs a complete absence of information in the scanned line.

The marking device 53 disclosed in this embodiment typically is shown as a type disclosed in copending application entitled, Electrical Recording Apparatus, filed May 7, 1965, Ser. No. 453,960.

Accordingly, as soon as the last line is printed, the step motor 34 is advanced one position further to enable scanning of the next line of information while the receiver marking device is advanced a like amount. On retrace of the oscillating mirror, a determination is again made of whether the subsequent line contains information. If present, the apparatus again reverts to the normal scan rate and the next line is scanned and printed. This sequence of events is repeated until the document has gone completely through the transmitting unit and has been faithfully reproduced by the remote transceiver in the receiver mode.

Figure 4:
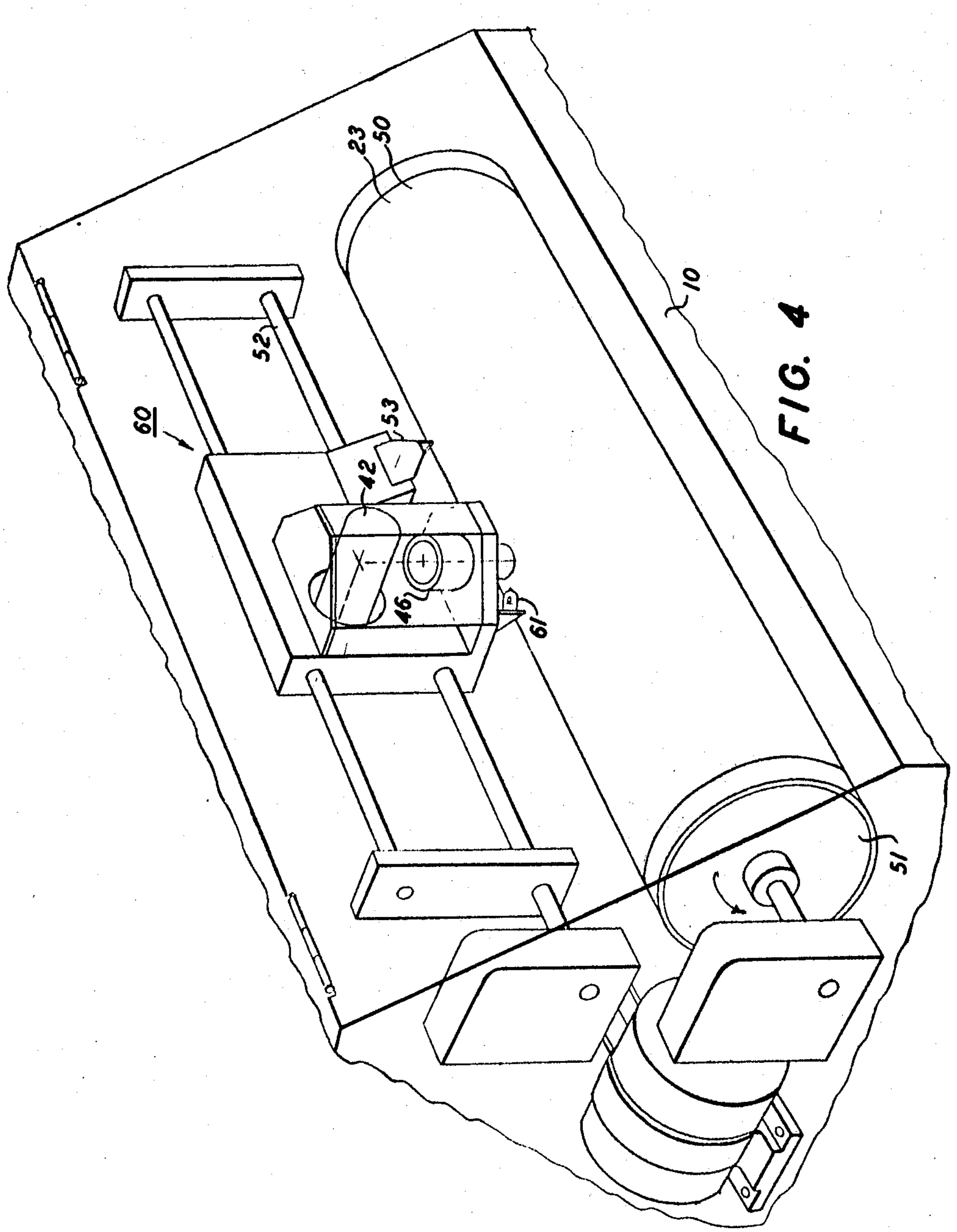
FIG. 4 is fragmentary isometric of an apparatus modification as could be incorporated in either of the foregoing embodiments.

Referring to FIG. 4 the embodiment thereof differs from the previous embodiments in the construction of the document and recording transport. As here shown the document scan transport and the recorder scan mechanism are combined in a manner permitting the apparatus to be used in the alternative with fewer operating components. In the transmitter mode drum 51 contains the original document wrapped thereabout. Scanning is effected by a carriage 60 secured for movement on the helix 52. A lamp 61 on the underside of the carriage illuminates the surface area of the document below which is then reflected through lens 40 into photomultipler 42 to be utilized similarly as above. Marking pen 53 is likewise secured to the carriage and is operable in the receiver mode similarly as above.

By above description there is disclosed a novel transceiving apparatus for a facsimile system readily adaptable for use in connection with direct distance dialing telephone networks. It provides a rapid compact system of operation in which each line of an original is scanned rapidly to determine the presence of information content. If there is no information, rapid scanning and advancing continues until such time as an information line is detected. Immediately, this places the apparatus into a normal scan mode and proper control pulses are transmitted and acted upon internally in the remote unit to properly print out all information. Since the signal pulse also advances the recording paper in the receiver a like amount as that in the transmitter, a completely faithful reproduction of even the blank spaces takes place. By advancing rapidly over the blank areas, transmission time of a typical typewritten page can be reduced from approximately six minutes to less than two.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A facsimile apparatus for use with a telephone receiver and transmitter operable in a direct distance dialing network comprising in combination:

(A) transmitting means selectively operative for providing an input to said telephone transmitter and including:

(1) oscillating mirror scanning means for optically scanning an original document;

(2) a photomultiplier receiving the scanned information from said scanning means to emit electrical pulse signals representative thereof;

(3) an acoustical coupling means operably connected to said telephone transmitter for transducing said signals to an acoustical level transmittable by said telephone transmitter;

(4) means to accelerate the operation of said transmitting means when the scanning means thereof scans an area of the document devoid of information;

(5) a stepping drive for advancing the original document in scanning relation to said scanning means and operable in conjunction with said scanning means to step at a first rate when said scanning means scans an area of information and to step at a second rate when said scanning means scans an area devoid of information; and (B) a receiver means selectively operative alternatively to said transmitter means to receive and utilize the output from said telephone receiver and including:

(1) pickup sensitive means connected to the receiver portion of said telephone receiver and sensitive to the output thereof for emitting electrical pulses corresponding thereto; and (2) recording means operably connected to said pickup means for marking a recording sheet in response to receipt of the electrical pulses thereof.

2. A facsimile system comprising a video transmitter and a remotely located receiver therefor linked by means of a telephone transmitter and telephone receiver respectively in a direct distance dialing network; said transmitting means being selectively operative for providing an input to said telephone transmitter and including:

(a) oscillating mirror scanning means for optically scanning an original document;

(b) a photomultiplier receiving the scanned information from said scanning means to emit electrical pulses representative thereof; and (c) an acoustical coupling means operably connected to said telephone transmitter for transducing said signals to an acoustical level transmittable by said telephone transmitter;

said receiver means being selectively operative in response to the transmission from said transmitter means to receive and utilize the output from said telephone receiver and including:

(a) pickup sensitive means connected to the receiver portion of said telephone receiver and sensitive to the output therefrom for emitting electrical pulses corresponding thereto;

(b) recording means operably connected to said pickup means for marking a recording sheet in response to receipt of the electrical pulses thereof;

(c) means to simultaneously accelerate the operation of said transmitter means and said receiver means when the scanning means scans an area of the document devoid of information; and (d) synchronized stepping drives having a first drive for advancing the original document in said transmitter in scanning relation to said scanning means and a second drive in said receiver for positioning said recording means in relative marking position to the recording sheet each being operable in conjunction wtih said scanning means to step at a first rate when said scanning means scans an area of information and to step at a second rate when said scanning means scans an area devoid of information.

3. A facsimile communication system comprising:

a first paper path for receiving an original document in the transmit mode, a second paper path for receiving a recording paper in the receive mode, optical scanning means for scanning said original document, photomultiplier means coupled to said scanning means for generating video signals representative of the information on said original document, means coupled to said photomultiplier means for transmitting said video signals in said transmit mode, means for receiving said transmitted video signals in said receive mode, recording means coupled to said receiving means for marking said recording paper in accordance with the information in said video signals, wherein said optical scanning means includes means coupled hereto to cause said optical scanning means to scan at a first rate when information is detected on said original document and to scan at a faster second rate when said scanning means scans an area devoid of information, means coupled to said photomultiplier means for detecting the scanning of the areas devoid of information and further transmitting a signal representative of each scan line detected thereby, all in the transmit mode, and wherein said receiving means includes means for advancing said recording paper past said recording means in response to said devoid area signals in the receive mode, said advancing means operable at said first rate upon the receipt of video information and at said second rate upon the receipt of said devoid area signals, said optical scanning means further includes light source means for flooding said original document, mirror means for reflecting the information modulated light received from said original document, and drive means coupled to said mirror means for causing said mirror means to oscillate in a direction substantially transverse to the direction of document movement along said first paper path, whereby said mirror means reflects onto said photomultiplier means said information modulated light representative of successive parallel scan lines on said document.

4. The system as set forth in claim 3 wherein said recording means includes:

drum means for fixedly mounting said recording paper thereto in said receive mode, marking means adjacent to said drum means for recording said received video information on said recording paper, second drive means for rotating said drum along its longitudinal axis thereby defining said second paper path and for moving said marking means in a direction along said longitudinal axis of said drum to mark successive parallel lines on said recording paper in the receive mode similar to said successive scan lines in the transmit mode.

5. The system as set forth in claim 4 wherein said first and second rates are continuous drive movements.

6. The system as set forth in claim 4 wherein said first and second rates are incremental stepping drive movements.

References Cited

UNITED STATES PATENTS

| | | | |
|---|---|---|---|
| 3,201,512 | 8/1965 | Mason et al. | |
| 2,903,517 | 9/1959 | Ridings | 179—4 |
| 3,229,033 | 1/1966 | Artzt. | |

ROBERT L. GRIFFIN, *Primary Examiner.*

W. S. FROMMER, *Assistant Examiner.*

U.S. Cl. X.R.

178—6, 7.1; 179—2